Figure 1:
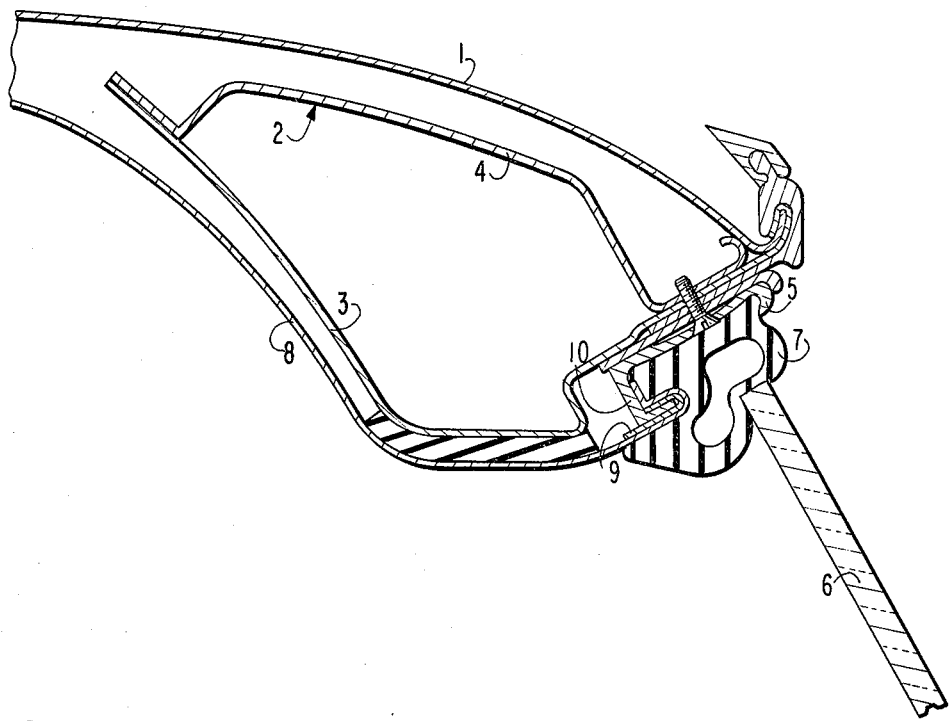

United States Patent [19]
Fleisch

[11] 4,070,055
[45] Jan. 24, 1978

[54] FASTENING OF INNER ROOF COVERING OF MOTOR VEHICLES

[75] Inventor: Eugen Fleisch, Rottenburg, Germany

[73] Assignee: Daimler-Benz Aktiengesellschaft, Germany

[21] Appl. No.: 669,768

[22] Filed: Mar. 24, 1976

[30] Foreign Application Priority Data

Mar. 26, 1975 Germany .............................. 2513300

[51] Int. Cl.² ............................................. B62D 25/06
[52] U.S. Cl. ............................................. 296/137 A
[58] Field of Search ................. 296/137 A, 137 R, 93, 296/146, 84 D

[56] References Cited

U.S. PATENT DOCUMENTS

| | | | |
|---|---|---|---|
| 2,143,943 | 1/1939 | Haberstump | 296/137 A |
| 2,955,875 | 10/1960 | Dominick et al. | 296/137 A |
| 3,191,988 | 6/1965 | Sturtevant et al. | 296/137 A |
| 3,252,732 | 5/1966 | Squier | 296/137 A |
| 3,294,436 | 12/1966 | Bull et al. | 296/137 A X |
| 3,433,526 | 3/1969 | Field et al. | 296/137 A |

Primary Examiner—Joseph F. Peters, Jr.
Assistant Examiner—Michael J. Forman
Attorney, Agent, or Firm—Craig & Antonelli

[57] ABSTRACT

A fastening arrangement of the inner roof covering of motor vehicles in which the edge area of the roof covering is constructed either U-shaped or L-shaped and is fixed by suspension at a mounting bar secured at the inner roof edge area of the vehicle; the mounting bar is provided with angularly bent flanges for receiving an elastic seal that serves simultaneously as positional retention means of the suspended area of the roof covering.

16 Claims, 2 Drawing Figures

FASTENING OF INNER ROOF COVERING OF MOTOR VEHICLES

The present invention relates to a fastening of the inner roof covering of motor vehicles.

The present invention is concerned with the task to provide a fastening of the roof ceiling of motor vehicles which is constructed in a simple manner, enables a rapid assembly and in case of repair also disassembly of the roof ceiling, and which does not appear otically in a disturbing manner in the interior space of the vehicle.

The underlying problems are solved according to the present invention in that the edge area of the roof covering is constructed U-shaped or L-shaped and is fixed by suspension at a mounting bar preferably consisting of synthetic plastic material and secured at the inner roof edge area of the vehicle, and in that the mounting bar includes angularly bent flanges for receiving an elastic seal which simultaneously serves as positional retention means of the suspended area of the roof covering.

Preferably, the U-shaped or L-shaped edge area is thereby formed by a retaining rail consisting of synthetic resinous material and connected with the roof covering, for example, by welding or gluing.

A particularly simple fastening of a roof covering with a U-shaped edge area, which also serves the inner safety of the vehicle, is achieved if the edge area embraces or extends about an outwardly pointing flange of the mounting bar.

A rapid assembly and secure fastening of a roof covering with an L-shaped edge area is achieved in that the free leg of the L-shaped mounting rail terminates in a thickened portion, for example, arrowhead-shaped and after the assembly is held under stress between two projecting legs of the mounting bar.

Accordingly, it is an object of the present invention to provide a fastening of the inner roof covering of motor vehicles which avoids by simple means the aforementioned shortcomings and drawbacks encountered in the prior art.

Another object of the present invention resides in a fastening arrangement for the inner roof covering of motor vehicles which is simple in construction and enables a rapid installation and disassembly in case of repair of the roof covering.

A further object of the present invention resides in a fastening arrangement of the inner roof covering of motor vehicles which does not appear optically disturbingly in the interior space of the vehicle.

Still a further object of the present invention resides in a fastening arrangement of the inner roof covering of motor vehicles which is not only particularly simple but also serves to improve the inner safety of the passengers.

Figure 2:
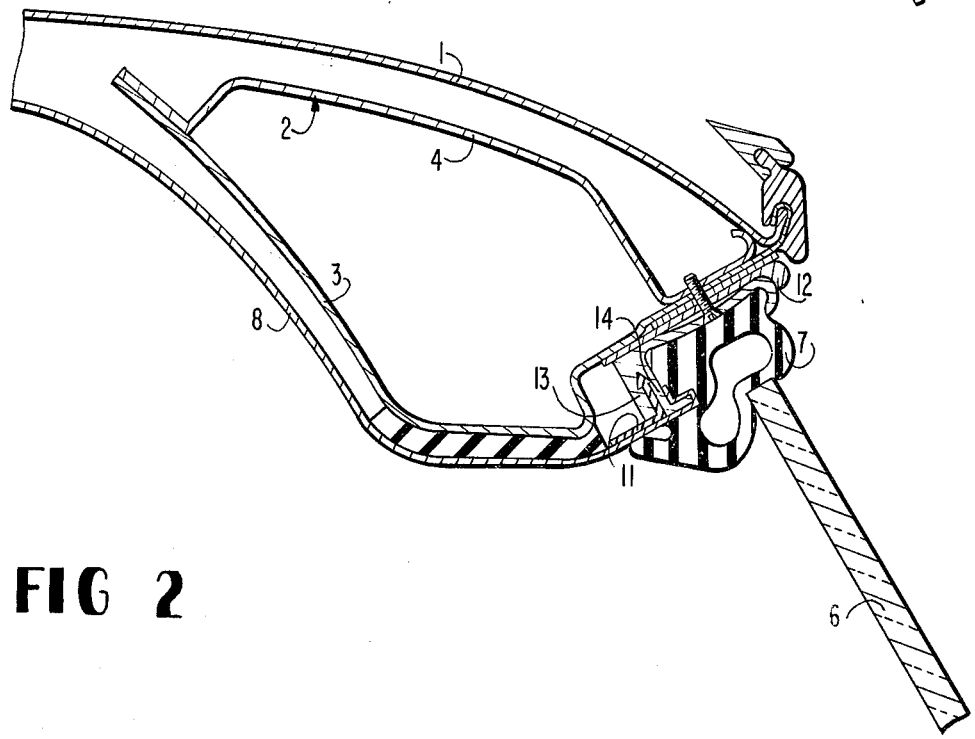

These and other objects, features and advantages of the present invention will become more apparent from the following description when taken in connection with the accompanying drawing which shows, for purposes of illustration only, two embodiments in accordance with the present invention, and wherein:

FIG. 1 is a cross-sectional view through the outer area of the roof frame of a motor vehicle whereby the edge area of the roof covering is constructed U-shaped in accordance with the present invention; and FIG. 2 is a cross-sectional view corresponding to FIG. 1 through a modified construction of the outer area of the roof frame of a motor vehicle whereby the edge area of the roof covering is constructed L-shaped in accordance with the present invention.

Referring now to the drawing wherein like reference numerals are used throughout the two views to designate like parts, and more particularly to FIG. 1, a roof frame generally designated by reference numeral 2 is provided in this figure below a roof outer cover panel 1; the roof frame 2 is formed by a roof frame inner sheet metal member 3 and by a closure sheet metal member 4. A mounting and retaining bar 5 preferably consisting of synthetic resinous material is threadably connected with the sheet metal members 3 and 4 which serves for the accommodation and mounting of an elastic seal 7 required, for example, for sealing frameless door windows 6. For purposes of fastening the roof covering 8 which within its edge area is connected, for example, by welding with the U-shaped mounting rail 9 consisting of synthetic resinous material, the mounting bar 5 includes an outwardly pointing flange 10 which is surrounded by the U-shaped mounting rail 9 after the assembly of the roof covering 8. The elastic seal 7 thereby serves simultaneously for securing the position of the U-shaped retaining or mounting rail 9.

In the embodiment of the present invention illustrated in FIG. 2 of the drawing, the construction of the roof frame corresponds exactly to that of FIG. 1. Accordingly, the same reference numerals are used for corresponding parts. However, the fastening of the roof covering 8 is solved in a different manner from that in the embodiment illustrated in FIG. 1. More particularly, the roof covering 8 of FIG. 2 is welded together in its edge area with an L-shaped mounting rail 11 which terminates at its free leg in a thickened portion, for example, in the shape of an arrowhead. This free leg is slid during the assembly between the two legs 13 and 14 projecting from the mounting bar 12 and is retained thereat under stress. Also in this embodiment of the present invention, the elastic seal 7 serves for the additional positional retention of the roof covering 8.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A fastening arrangement of an inner roof covering of motor vehicles, characterized in that an edge area of the roof covering is joined with a mounting rail means, which is configured so as to be retainably engaged with a mounting bar means, said mounting bar means being secured at an inner roof edge area of the vehicle, the mounting bar means including angularly bent flange means receiving an edge area of said roof covering and an elastic means simultaneously serving as a positional retention means for the received edge area of the roof covering with said edge area being received between said elastic means and said flange means and as a window seal.

2. A fastening arrangement according to claim 1, characterized in that the edge area of the roof covering is fixed at the mounting bar means by suspension.

3. A fastening arrangement according to claim 2, characterized in that the mounting rail means which is joined to the roof covering is constructed approximately U-shaped.

4. A fastening arrangement according to claim 3, characterized in that the U-shaped mounting rail means surrounds an outwardly extending flange of the mounting bar means.

5. A fastening arrangement according to claim 2, characterized in that the mounting rail means which is joined to the roof covering is constructed approximately L-shaped.

6. A fastening arrangement according to claim 5, characterized in the L-shaped mounting rail means has a leg joined to said roof covering and a free leg that terminates in a thickened portion and after assembly is held under stress between two projecting legs of the mounting bar means.

7. A fastening arrangement according to claim 2, characterized in that the mounting bar means is formed of synthetic resinous material.

8. A fastening arrangement according to claim 1, characterized in that the mounting rail is formed of synthetic resinous material.

9. A fastening arrangement according to claim 8, characterized in that the edge area of the roof covering is joined to the mounting rail means by welding.

10. A fastening arrangement according to claim 9, characterized in that the mounting rail means is constructed approximately U-shaped.

11. A fastening arrangement according to claim 10, characterized in that the U-shaped edge area surrounds an outwardly extending flange of the mounting bar means.

12. A fastening arrangement according to claim 9, characterized in that the mounting rail means is constructed approximately L-shaped.

13. A fastening arrangement according to claim 12, characterized in the L-shaped mounting rail means has a leg joined to said roof covering and a free leg that terminates in a thickened portion which, after assembly, is held under stress between two projecting legs of the mounting bar means.

14. A fastening arrangement according to claim 13, characterized in that the thickened portion is substantially in the shape of an arrowhead.

15. A fastening arrangement according to claim 8, characterized in that the edge area of the roof covering is joined to said mounting rail means by gluing.

16. A fastening arrangement of an inner roof covering of motor vehicles, characterized in that an edge area of the roof covering is joined with a mounting rail means, which is configured so as to be retainably engaged with a mounting bar means, said mounting bar means being secured at an inner roof edge area of the vehicle, the mounting bar means including angularly bent flange means receiving an edge area of said roof covering and an elastic means simultaneously serving as a positional retention means for the received edge area of the roof covering with said rail means being received between said elastic means and said flange means, and as a window seal.

* * * * *